United States Patent [19]
Kanne

[11] Patent Number: 5,720,450
[45] Date of Patent: Feb. 24, 1998

[54] PRECISION ALIGNMENT AND MOVEMENT RESTRICTION SAFEGUARD MECHANISM FOR LOADING MULTIPLE SATELLITES INTO A LAUNCH VEHICLE

[75] Inventor: Mark Melvin Kanne, Chandler, Ariz.

[73] Assignee: Motorola, Inc., Schaumburg, Ill.

[21] Appl. No.: 398,829

[22] Filed: Mar. 6, 1995

[51] Int. Cl.[6] .................... B64G 1/22; B64C 1/22; B64D 9/00
[52] U.S. Cl. .................... 244/158 R; 244/118.1; 244/137.1
[58] Field of Search ............ 244/118.1, 158 R, 244/137.1, 161; 294/864

[56] References Cited

U.S. PATENT DOCUMENTS

| | | | |
|---|---|---|---|
| 4,615,656 | 10/1986 | Geraghty, Jr. | 294/86.4 |
| 4,652,204 | 3/1987 | Arnett | 294/86.4 |
| 4,974,796 | 12/1990 | Carr et al. | 244/118.1 |
| 5,411,226 | 5/1995 | Jones et al. | 244/158 R |

Primary Examiner—Andres Kashnikow
Assistant Examiner—Virna Lissi Mojica
Attorney, Agent, or Firm—Sherry Whitney

[57] ABSTRACT

Multiple satellites are densely packed in modern multi-satellite launch vehicles. Stocking of a subsequent satellite (20) in the presence of adjacent satellites (12) subjects both satellites to damage due to mishandling and human error during craning operations. An alignment mechanism (30) attaches to subsequent satellite (20) and operates in conjunction with a craning tether (26) to stock a launch vehicle dispenser (10) with subsequent satellite (20). An alignment mechanism (30) restricts lateral motion of subsequent satellite (20) during stocking while keeping subsequent satellite (20) centrally located in a vacant position on a launch vehicle dispenser (10).

12 Claims, 2 Drawing Sheets

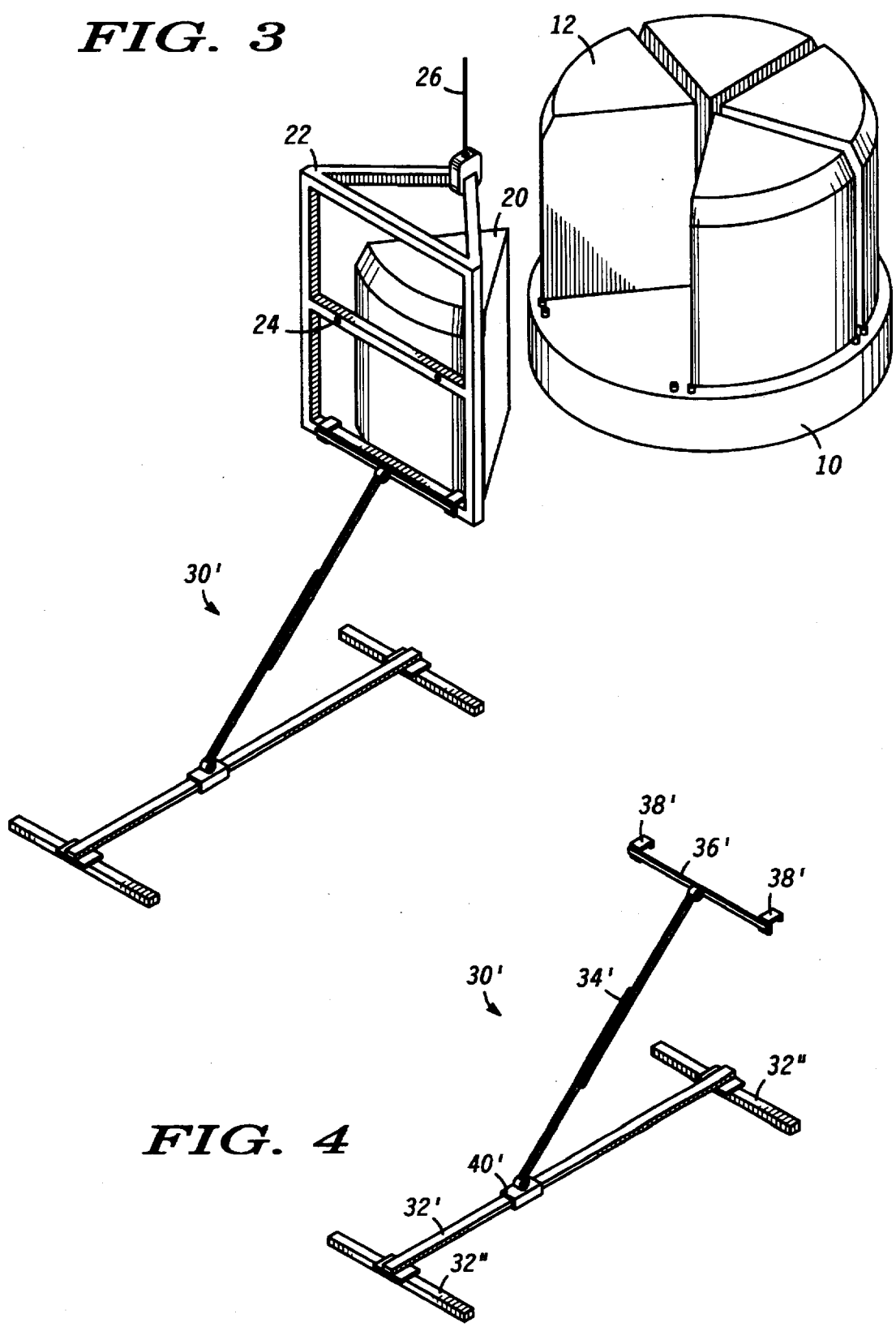

PRECISION ALIGNMENT AND MOVEMENT RESTRICTION SAFEGUARD MECHANISM FOR LOADING MULTIPLE SATELLITES INTO A LAUNCH VEHICLE

FIELD OF THE INVENTION

The present invention relates generally to loading of satellites into a launch vehicle, and more particularly, to protection of a present and previously loaded satellites in a multi-satellite dispenser.

BACKGROUND OF THE INVENTION

Traditionally, communication satellites have been extremely expensive and time-consuming to develop and launch. One reason is because satellite specifications require very high reliability and extensive testing. Also, design parameters require great detail in minimization of structural mass of the satellite in order to maximize both orbit-maintaining fuel carried by the satellite and launch vehicle fuel. Minimization of structural mass causes satellites to become delicate and susceptible to damage through mishandling.

Historically, satellites were generally larger and had greater mass than at the present. Also, part of the increased size was due to higher orbits. Higher orbits require satellites to operate at increased power levels to provide sufficient communication capabilities for a user on Earth. Because of a traditional satellite's large size and weight, a typical launch vehicle hoisted only a single satellite into orbit. The loading of this single satellite onto the launch vehicle prior to launch, was an infrequent, manually intensive process with rather loose tolerances and concerns for adjacent structures.

Modernly, satellite technology has become increasingly more commercialized. Creative communication applications for satellites utilize lower orbits with communication interconnections through multiple satellites. These applications for satellites frequently utilize an increased quantity of satellites. Technological advances have decreased satellite component sizes and masses leading to smaller physical geometries of satellites. These decreases in size and mass now enable a launch vehicle to hoist multiple satellites into orbit on a single launch.

To efficiently utilize expensive launch vehicle resources, satellites are preferably closely packed into a launch vehicle dispenser. Minimal tolerances between each of the delicate satellites is preferable for efficient packing. Traditional methods of hoisting and manually stocking and placing satellites are too susceptible to human error. The potential for both damage to adjacent satellites and the satellite currently being loaded is substantial. Also, down-time associated with replacing and remanufacturing a replacement satellite is far too costly for a commercially competitive environment.

Thus what is needed is a precision alignment mechanism. What is also needed is an apparatus capable of reducing or eliminating errors in the loading, stocking, and placement of satellites on a launch vehicle dispenser.

BRIEF DESCRIPTION OF THE DRAWINGS

FIG. 3 depicts a craning operation of loading satellites utilizing another embodiment of an alignment mechanism, in accordance with an embodiment of the present invention.

FIG. 4 depicts a more detailed view of an alignment mechanism, in accordance with an embodiment of the present invention.

DESCRIPTION OF THE PREFERRED EMBODIMENT

Figure 1:
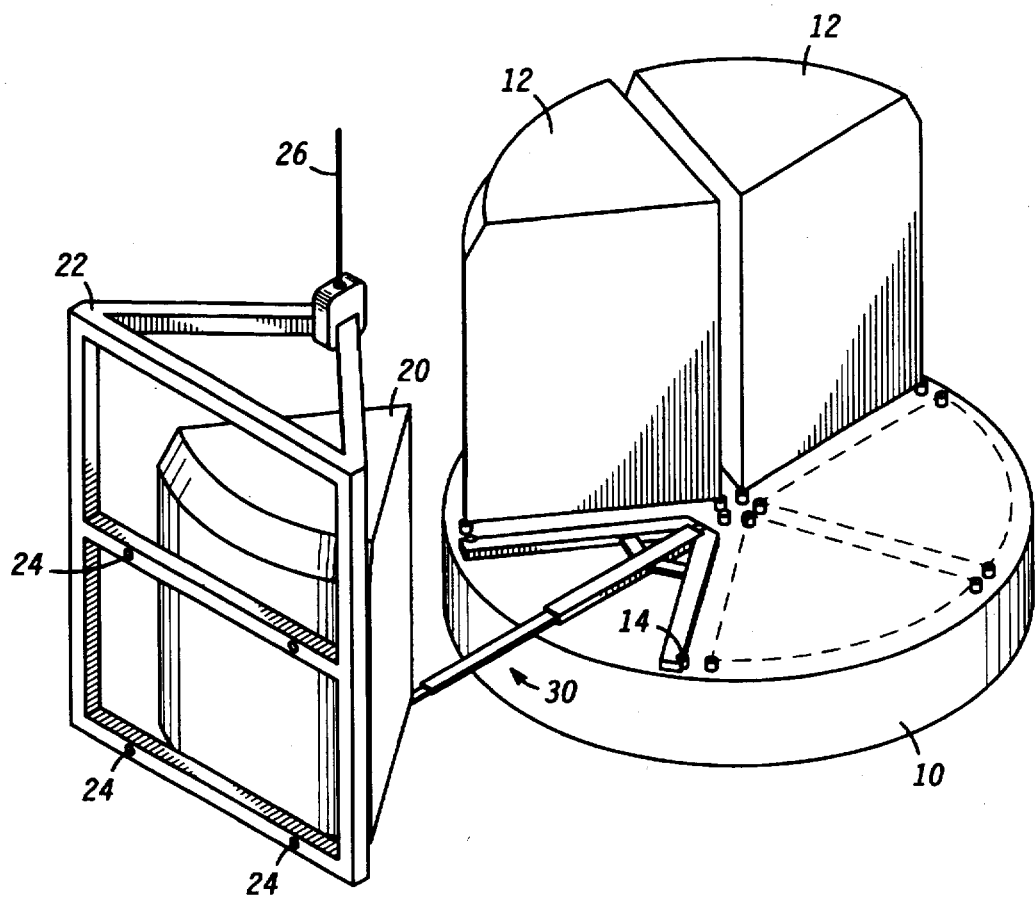
FIG. 1 depicts a craning operation of loading satellites utilizing an alignment mechanism mountable to a launch vehicle dispenser, in accordance with a preferred embodiment of the present invention.

FIG. 1 depicts a craning operation of loading satellites utilizing an alignment mechanism mountable to a launch vehicle dispenser, in accordance with a preferred embodiment of the present invention. A launch vehicle is typically composed of segments, each having a specific purpose. Each of these segments is individually prepared and subsequently joined together to form the assembled launch vehicle. Payloads are generally loaded onto a segment capable of deploying or dispensing the payload once in orbit.

Launch vehicle dispenser 10 may be of many shapes and varieties. Shown is a typical disk-shaped segment as is commonly used. Launch vehicle dispenser 10 has radially spaced guide pins 14 for orienting and/or securing satellites to launch vehicle dispenser 10. Frequently, guide pins 14 are removed prior to launch and replaced with more exotic explosive fasteners for activation and deployment once in orbit.

Adjacent satellites 12 are shown as being evenly distributed about launch vehicle dispenser 10. The shape of adjacent satellites 12 are not important to this invention. Shown are generally triangularly-cylindrically shaped satellites or footprints of vacant locations. Furthermore, the order of emplacement or stocking of a launch vehicle dispenser 10 is not critical to the present invention.

Alignment mechanism 30 attaches to the planer side of launch vehicle dispenser 10. Guide pins 14 are used to orient alignment mechanism 30 with a vacant position on launch vehicle dispenser 10. Alignment mechanism 30 serves as a lateral restriction device during stocking of launch vehicle dispenser 10.

As discussed above, satellites desirably have minimal structural mass and therefore hard-points or points of attachment are frequently distributed. Subsequent satellite 20 (i.e., the satellite presently being loaded) is shown attached to satellite support sling 22 using distributed sling fasteners 24. Satellite support sling 22 provides additional stiffness and handling points for maneuvering subsequent satellite 20.

Craning tether 26 supports and maneuvers subsequent satellite 20 during dispenser stocking operations. Although craning tether 26 may have full range of lateral movement, alignment mechanism 30 provides damping and restriction to crude lateral movements that could damage adjacent satellites 12.

Figure 2:
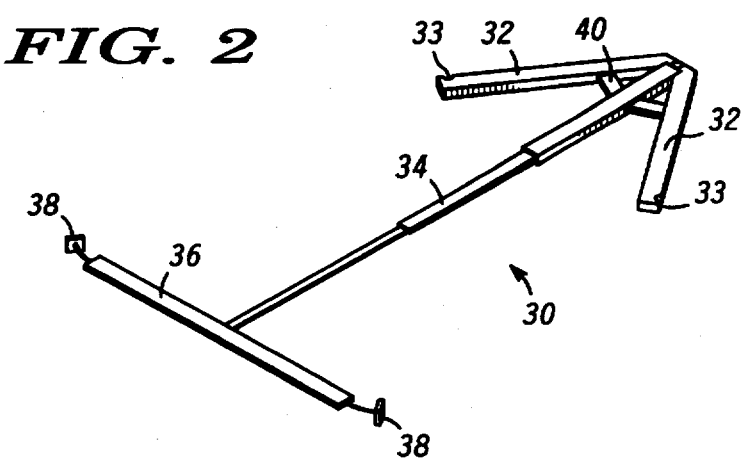
FIG. 2 depicts a more detailed view of an alignment mechanism mountable to a launch vehicle dispenser, in accordance with a preferred embodiment of the present invention.

FIG. 2 depicts a more detailed view of an alignment mechanism mountable to a launch vehicle dispenser, in accordance with a preferred embodiment of the present invention. Alignment mechanism 30 for precision alignment of subsequent satellite 20 and safeguarding of adjacent satellites 12 is shown in detail. Alignment mechanism 30 attaches and orients to launch vehicle dispenser 10 using alignment base members 32.

Alignment base members 32 attach to launch vehicle dispenser 10 at one end by interfacing with guide pins 14. This interface may be of many forms such as direct fastening with bolts or, as is shown, a slotted locking mechanism 33. Slotted locking mechanism 33 provides a more expeditious interconnection without requiring extraneous hardware. Alignment base members 32 are pivotally connected at the opposing end. This symmetry of alignment base members 32 facilitates self-centering of alignment mechanism 30, thus restricting subsequent satellite 20 to a more desirable and safer approach angle during loading.

Directional restriction arm 34 is an elongated arm interfacing at one end with the pivotal joint of alignment base members 32. The other end of directional restriction arm 34 extends to provide a controllable standoff for subsequent satellite 20, and restricts travel of subsequent satellite 20 to its longitudinal axis. Directional restriction arm 34, in this embodiment, is depicted as telescopic channel members. Directional restriction arm 34 collapses or advances longitudinally as craning tether 26, hoisting subsequent satellite 20, advances closer to launch vehicle dispenser 10. Other embodiments of this element are possible such as a rail and wheel system or a channel and guide wheel implementation.

The positioning and pivotal joining of directional restriction arm 34 between alignment base members 32 allows radial deflection of directional restriction arm 34 between alignment base members 32. Optimal safeguarding of adjacent satellites 12 during stocking of launch vehicle dispenser 10 occurs when directional restriction arm 34 is equidistant from guide pins 14.

Restraining bodies 40 restrict radial deflection of directional restriction arm 34 by providing equally opposing forces to directional restriction arm 34 between alignment base members 32. Restraining bodies 40 may take on embodiments of gas or air struts, springs or any other resistance-providing configurations. Restraining bodies 40 could be rigid if slotted locking mechanism 33 accommodated removal of alignment mechanism 30 following a completed loading of subsequent satellite 20.

Attachment cross member 36 provides spatial diversity to fasteners 38. Attachment cross member 36 may be integral with directional restriction arm 34 or attached by conventional fastening techniques (e.g., bolting, welding). Fasteners 38 are shown pivotally coupled to attachment cross member 36. Such an attachment facilitates vertical movement of subsequent satellite 20 during craning and loading of launch vehicle dispenser 10.

FIG. 3 depicts a craning operation of loading satellites utilizing another embodiment of an alignment mechanism, in accordance with an embodiment of the present invention. A launch vehicle dispenser 10 may not lend itself to having an alignment mechanism attached thereto. One reason may be that the surface of launch vehicle dispenser 10 is not planer or has interfering support structures and is therefore unable to accommodate an embodiment as shown in FIG. 1 and FIG. 2. In such circumstances, an alignment mechanism 30' as depicted in FIG. 3 may perform the function of alignment and movement safeguarding as described above.

In this embodiment, launch vehicle dispenser 10 is shown with radially spaced adjacent satellites 12. Alignment mechanism 30' is oriented with launch vehicle dispenser 10 to provide lateral restriction during stocking of subsequent satellite 20 on launch vehicle dispenser 10. Subsequent satellite 20 is shown with satellite support sling 22 and suspended by craning tether 26. In this embodiment as with the previous one, alignment mechanism 30' provides damping and restriction to crude lateral movements that could damage adjacent satellites 12. Alignment mechanism 30' provides safeguarding by restricting swing and twist of subsequent satellite 20 as craning tether 26 advances toward launch vehicle dispenser 10.

FIG. 4 depicts a more detailed view of an alignment mechanism, in accordance with an embodiment of the present invention. Alignment mechanism 30', for precision alignment of subsequent satellite 20 and safeguarding of adjacent satellites 12, is shown in detail. Alignment mechanism 30' attaches or is placed upon a base or floor and is oriented to launch vehicle dispenser 10 using alignment members comprised of precision channel rail 32' and transverse stabilizing member 32". Precision channel rail 32' provides a tolerance track that dictates allowable lateral range of motion to subsequent satellite 20. Transverse stabilizing members 32" prevent precision channel rail 32' from twisting or rolling when lateral torque is applied to alignment mechanism 30' during stocking of subsequent satellite 20.

The restraining body of alignment mechanism 30' is an adjustable linear sleeve bearing 40'. Adjustable linear sleeve bearing 40' communicates with precision channel rail 32' and provides minimal rotational deflection when subjected to the lateral torque associated the crude movements of craning tether 26 during stocking of subsequent satellite 20. Sliding friction between adjustable linear sleeve bearing 40' and precision channel rail 32' is adjustable according to the craning mass of subsequent satellite 20.

In alignment mechanism 30', the directional restriction arm is an adjustable height member 34'. Adjustable height member 34' adjusts in height to accommodate both a varying height of launch vehicle dispenser 10 and the placement proximity of alignment mechanism 30' to launch vehicle dispenser 10. Attachment cross member 36' pivotally attaches to adjustable height member 34' and provides spatial diversity for fasteners 38'. Fasteners 38' may either attach directly to subsequent satellite 20 or as shown in FIG. 4, comprise an angle-hook arrangement with a spring pin for attaching directly to satellite support sling 22.

Thus there has been described herein an apparatus, as well as several embodiments including a preferred embodiment, of a precision alignment and movement restriction safeguard mechanism for loading multiple satellites into a launch vehicle.

Because the various embodiments of the safeguarding mechanism as herein-described, among other things, reduces the potential for damage to satellites due to both human error and unrefined craning equipment, multi-satellite stocking of launch vehicle dispensers is significantly less susceptible to costly damage and down-time.

It will be apparent to those skilled in the art that the disclosed invention may be modified in numerous ways and may assume many embodiments other than the preferred form specifically set out and described above.

What is claimed is:

1. A precision alignment mechanism for safeguarding adjacent satellites on a launch vehicle dispenser comprising:

an attachment cross member for coupling and orienting a subsequent satellite with said mechanism, said attachment cross member being elongated and having a first end and a second end;

a plurality of fasteners for removably coupling said attachment cross member to said subsequent satellite, said plurality of fasteners being affixed to each of said first end and said second end of said attachment cross member;

a directional restriction arm for restricting lateral movement of said subsequent satellite in relation to said launch vehicle dispenser, said directional restriction arm being elongated and having a first end coupled to said attachment cross member and a second end;

a plurality of alignment base members for orienting and aligning said mechanism to a vacant position on said launch vehicle dispenser, orientation of said plurality of alignment base members defining a range of movement of said subsequent satellite; and at least one restraining body connected between said directional restriction arm and said plurality of alignment base members, said at least one restraining body restricting lateral movement of said directional restriction arm during said emplacement of said subsequent satellite into said vacant position on said launch vehicle dispenser.

2. A precision alignment mechanism as recited in claim 1, wherein said directional restriction arm comprises of a plurality of telescoping channel members.

3. A precision alignment mechanism as recited in claim 1, wherein said plurality of alignment base members comprise a first member and a second member, both said first member and said second member each having a first end and a second end, said first end of said first member and said first end of said second member being pivotally joined, said second end of said first member and said second end of said second member each having a slotted locking mechanism for receiving and locking to a plurality of guide pins located on said launch vehicle dispenser.

4. A precision alignment mechanism as recited in claim 3, wherein said at least one restraining body comprises a first strut having a first end and a second end and a second strut also having a first and second end, said first end of said first strut being attached to said first member of said plurality of alignment base members and said first end of said second strut being attached to said second member of said plurality of alignment base members, said second end of said first strut and said second end of said second strut being opposingly attached to said directional restriction arm.

5. A precision alignment mechanism as recited in claim 1, wherein said plurality of fasteners are pivotally attached to said attachment cross member allowing said subsequent satellite to be vertical adjusted while fastened to said mechanism.

6. A precision alignment mechanism as recited in claim 1, wherein during emplacement of said subsequent satellite onto said launch vehicle dispenser, said subsequent satellite further comprises a satellite support sling for providing additional rigidity to said subsequent satellite during emplacement.

7. A precision alignment mechanism as recited in claim 6, wherein said plurality of fasteners couple to said satellite support sling.

8. A precision alignment mechanism as recited in claim 1, wherein said directional restriction arm comprises a plurality of adjustable height members for accommodating varying heights of said launch vehicle dispenser.

9. A precision alignment mechanism as recited in claim 8, wherein said plurality of alignment base members comprises a precision channel rail having two ends, two transverse stabilizing members centrally fastened to each of said two ends of said precision channel rail.

10. A precision alignment mechanism as recited in claim 9, wherein said at least one restraining body comprises an adjustable linear sleeve bearing pivotally coupled to one of said adjustable height members and slideably traveling upon said precision channel rail.

11. A precision alignment mechanism for safeguarding adjacent satellites on a launch vehicle dispenser comprising:

an attachment cross member for coupling and orienting a subsequent satellite with said mechanism, said attachment cross member being elongated and having a first end and a second end;

a plurality of fasteners for removably coupling said attachment cross member to said subsequent satellite, said plurality of fasteners being affixed to each of said first end and said second end of said attachment cross member;

a directional restriction arm for restricting lateral movement of said subsequent satellite in relation to said launch vehicle dispenser, said directional restriction arm having a plurality of telescoping channel members, said directional restriction arm also having a first end coupled to said attachment cross member and a second end;

two alignment base members for orienting and aligning said mechanism with a vacant position on said launch vehicle dispenser, said first alignment base member and said second alignment base member each having a first end and a second end, said first end of said first alignment base member and said first end of said second alignment base member being pivotally joined, said second end of said first alignment base member and said second end of said second alignment base member each having a slotted locking mechanism for receiving and locking to a plurality of guide pins located on said launch vehicle dispenser; and a plurality of restraining bodies connected between said directional restriction arm and said two alignment base members, said plurality of restraining bodies restricting lateral movement of said directional restriction arm during said emplacement of said subsequent satellite into said vacant position on said launch vehicle dispenser.

12. A precision alignment mechanism as recited in claim 11, wherein said plurality of restraining bodies comprises a first strut having a first end and a second end and a second strut also having a first and second end, said first end of said first strut being attached to said first alignment base member and said first end of said second strut being attached to said second alignment base member, said second end of said first strut and said second end of said second strut being opposingly attached to said directional restriction arm.

* * * * *